(12) United States Patent
Oosawa

(10) Patent No.: US 9,122,300 B2
(45) Date of Patent: Sep. 1, 2015

(54) ROTARY OPERATION DEVICE

(71) Applicant: SUMITOMO WIRING SYSTEMS, LTD., Mie (JP)

(72) Inventor: Yasuhiro Oosawa, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 222 days.

(21) Appl. No.: 13/765,079

(22) Filed: Feb. 12, 2013

(65) Prior Publication Data

US 2013/0233106 A1 Sep. 12, 2013

(30) Foreign Application Priority Data

Mar. 6, 2012 (JP) .................................. 2012-049155

(51) Int. Cl.
*G05G 1/10* (2006.01)
*F16H 35/00* (2006.01)

(52) U.S. Cl.
CPC ................ *G05G 1/10* (2013.01); *F16H 35/008* (2013.01); *Y10T 74/19679* (2015.01)

(58) Field of Classification Search
CPC ....................................................... G05G 1/10
USPC ................... 74/10 R, 10.1, 10.2, 10.41, 10.8; 73/1.88; 200/11 R, 316, 336, 564
See application file for complete search history.

(56) References Cited

U.S. PATENT DOCUMENTS

| 3,069,914 | A | * | 12/1962 | Laubenfels | .................... | 74/10.2 |
| 3,267,749 | A | * | 8/1966 | Tanner et al. | ................ | 74/10.45 |
| 3,650,156 | A | * | 3/1972 | Thomas | .......................... | 74/10.2 |
| 3,857,360 | A | * | 12/1974 | Tonari et al. | ................... | 116/245 |
| 7,521,640 | B2 | * | 4/2009 | Kodama et al. | ............... | 200/336 |

FOREIGN PATENT DOCUMENTS

JP     2007-296956     11/2007

* cited by examiner

*Primary Examiner* — William Kelleher
*Assistant Examiner* — Thomas Magnuson
(74) *Attorney, Agent, or Firm* — Greenblum & Bernstein, P.L.C.

(57) ABSTRACT

A rotary operation device that can prevent misassembly of a rotary operation member and a rotational force transmission member, has a rotary operation member, a rotation detector, and a rotational force transmission member. The rotary operation member has a first gear and the rotational force transmission member has a second gear and a transmission axis. One of the rotary operation member and the rotational force transmission member has a first interference portion that interferes with the other member in a position misaligned from a proper engagement position where the first gear and the second gear are engaged in a proper phase relationship. The other member comprises a second interference member that interferes with the first interference portion in a position misaligned from the proper engagement position and an escape portion that receives the first interference portion in the proper engagement position to allow assembly with the one member.

4 Claims, 6 Drawing Sheets

ROTARY OPERATION DEVICE

CROSS-REFERENCE TO RELATED APPLICATIONS

The present application claims priority under 35 U.S.C. §119 of Japanese Application No. 2012-049155, filed on Mar. 6, 2012, which is herein expressly incorporated by reference in its entirety.

BACKGROUND OF THE INVENTION

1. Field of the Invention

The present invention relates to a rotary operation device used to operate an electronic device mounted in a vehicle.

2. Description of Related Art

A rotary operation device is conventionally known as an operation device mounted in various electronic devices. When being mounted in a vehicle, such as an automobile, for example, such a rotary operation device is used to operate an electronic device in the vehicle, specifically, an air conditioner, a car navigation system, or a car audio system. Related Art 1 discloses such a rotary operation device, which includes a rotary operation member, a rotation detector, and a rotational force transmission member. The rotary operation member is rotated around a specific rotation axis. The rotation detector detects a rotary operation amount of the rotary operation member. The rotational force transmission member transmits a rotational force of the rotary operation member to the rotation detector. The rotary operation member has a first gear on an entire periphery of the rotation axis. The rotational force transmission member has a second gear and a transmission axis. The second gear is engaged with the first gear and is thus rotated in association with rotation of the rotary operation member. The transmission axis rotates integrally with the second gear. The transmission axis, which is reliably positioned to the rotation detector and is coupled therewith, transmits the rotation to the rotation detector. Thus, an output from the rotation detector varies in accordance with the operation amount of the rotary operation member. In other words, the operation position of the rotary operation member and the output from the rotation detector are in a constant relationship with each other in the rotary operation device.

The rotary operation device should be assembled such that the first gear of the rotary operation member and the second gear of the rotational force transmission member are provided in a proper engagement position where the gears are surely engaged in a proper phase relationship. With the gears assembled in the proper engagement position, the rotary operation member is rotated to a predetermined operation position, and then the rotation detector outputs an appropriate signal associated with the operation position or operation amount. However, in a case where the teeth of the first gear and the teeth of the second gear are misaligned from the proper engagement position even at one tooth in assembly, even when the rotary operation member is rotated to the operation position or operation amount, the rotation detector outputs a signal different from the appropriate signal or there is an error in the output signal. For instance, in a case where the rotation detector is of a variable resistance type and the rotary operation member and the rotational force transmission member are assembled in a position misaligned from the proper engagement position, even when the rotary operation member is rotated to the predetermined position, the rotation detector outputs a signal based on a resistance value different from a resistance value that renders the appropriate signal. In a case where the rotation detector is a rotary encoder that outputs pulses and the rotary operation member and the rotational force transmission member are assembled in a position misaligned from the proper engagement position, a pulse signal is likely to be output at an operation amount different from an operation amount of the rotary operation member at which a predetermined pulse signal is output. Specifically, the rotation detector and the rotational force transmission member are reliably positioned and assembled. Thus, when the rotary operation member and the rotational force transmission member are assembled with the first gear and the second gear misaligned from the proper engagement position, the malfunctions above occur.

In this regard, the rotary operation device disclosed in Related Art 1 has a confirmation mark on at least either of the rotary operation member or the rotational force transmission member. This confirmation mark enables confirmation of the first gear and the second gear in the proper engagement position during assembly of the rotary operation member and the rotational force transmission member. This facilitates assembly of the members in the proper engagement position.

[Related Art 1] Japanese Patent Laid-Open Publication No. 2007-296956

However, even when the rotary operation member and the rotation detector are assembled while the confirmation mark is being checked, the rotary operation member and the rotation detector are possibly assembled with the first gear and the second gear in a position misaligned from the proper engagement position. Thus, a concern over misassembly of the members still remains.

SUMMARY OF THE INVENTION

In view of the circumstances above, the present invention provides a rotary operation device that can prevent misassembly of a rotary operation member and a rotational force transmission member.

In view of the circumstances above, the present invention provides a rotary operation device including a rotary operation member rotated around a specific rotation axis; a rotation detector detecting rotary operation of the rotary operation member; and a rotational force transmission member transmitting, to the rotation detector, a rotational force generated in association with the rotary operation of the rotary operation member. The rotary operation member includes a first gear transmitting the rotational force of the rotary operation member to the rotational force transmission member. The rotational force transmission member includes a second gear engaged with the first gear; and a transmission axis linked to the second gear, rotatable around a central axis thereof, and coupled with the rotation detector. One of the rotary operation member and the rotational force transmission member includes a first interference portion provided in a portion displaced in a rotation direction in accordance with rotation thereof and having a shape that interferes with the first interference portion so as to prevent assembly with the other member in a position misaligned from a proper engagement position where the first gear and the second gear are engaged in a proper phase relationship. The other member includes a second interference member and an escape portion, the second interference member being provided in a portion displaced in a rotation direction in accordance with rotation thereof and having a shape that interferes with the first interference portion so as to prevent assembly with the one member in a position where the first gear and the second gear are misaligned from the proper engagement position, the escape portion having a shape that receives the first interference portion when the first gear and the second gear are provided in the proper engagement position so as to prevent interference with the first interference portion and allow assembly with the one member and that prevents interference with the first interference portion when the rotary operation member and the rotational force transmission member are rotated relative to each other in a state where the first gear and the second gear are assembled in the proper engagement position.

The rotary operation device of the present invention can prevent misassembly of the rotary operation member and the rotational force transmission member. Specifically, when the first gear and the second gear are provided in the proper engagement position where the gears are engaged in the proper phase relationship, the first interference portion of the one member is received in the escape portion of the other member and does not interfere with the other member, thus allowing assembly of the members at this position. In contrast, when the first gear and the second gear are provided in a position misaligned from the proper engagement position, the first interference portion interferes with the second interference portion, thus preventing assembly of the members at this position. In addition, the escape portion has a shape that does not interfere with the first interference portion when the rotary operation member and the rotational force transmission member are rotated relative to each other in a state where the first gear and the second gear are assembled in the proper engagement position, thus not affecting operability of the rotary operation member after the members are assembled.

Furthermore, in the present invention, preferably the gear of the one member is rotated in the rotation direction thereof in association with rotation of the gear and includes a rotation surface intersecting a rotation axis direction of the gear. The first interference portion is preferably linked to the rotation surface at a position inward of an outer periphery of the rotation surface. The second interference portion preferably has a shape projecting outward of an outer periphery of the gear of the other member in a radial direction of the gear. The escape portion is preferably positioned adjacent to the second interference portion along a circumferential direction of the other member.

Thus, the first interference portion is linked to the rotation surface intersecting the rotation axis direction of the gear at a position inward of the outer periphery of the rotation surface. Unlike a case where the first interference portion projects outward of the outer periphery of the rotation surface, damage is effectively limited to the first interference portion when an external force is exerted on the first interference portion in the rotation axis direction during assembly of the rotary operation member and the rotational force transmission member.

Furthermore, in the present invention, the first interference portion is preferably a projection projecting from the rotation surface in the rotation axis direction of the gear. The escape portion is preferably a recess recessed inward of an outer periphery of the second interference portion. The recess preferably includes an opposing portion and a pair of widening portions, the opposing portion facing an outer portion of the projection orthogonal to the rotational axis direction of the projection when the first gear and the second gear are provided in the proper engagement position, the pair of widening portions extending from the opposing portion and widening so as to be further apart from each other toward the projection from two ends of the second interference portion in the rotation direction in the opposing portion.

As described above, the present invention provides the rotary operation device that can prevent misassembly of the rotary operation member and the rotational force transmission member.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 4B:
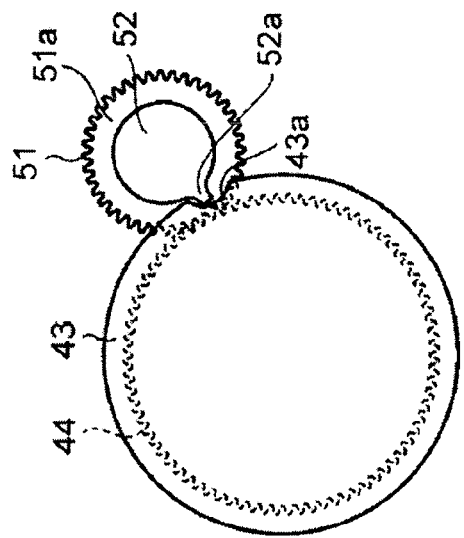
FIGS. 4(a) to 4(d) each illustrate an engagement/disengagement relationship between the projection and the recess of the rotary operation device according to the first embodiment.
Figure 4D:
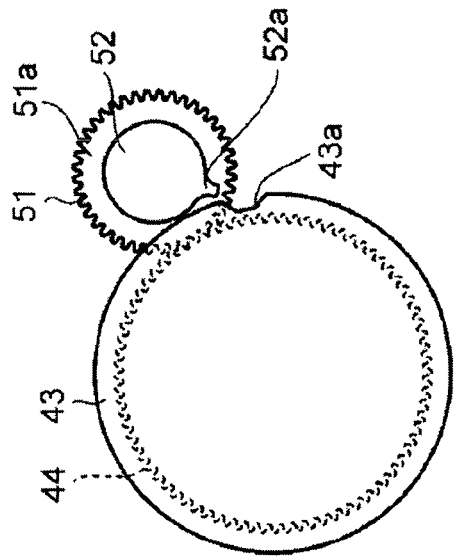
Figure 4A:
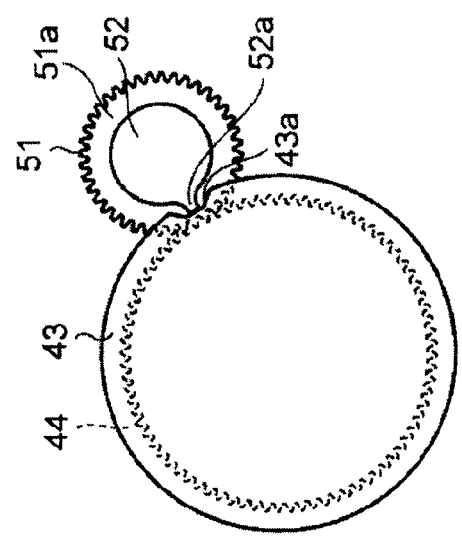
Figure 4C:
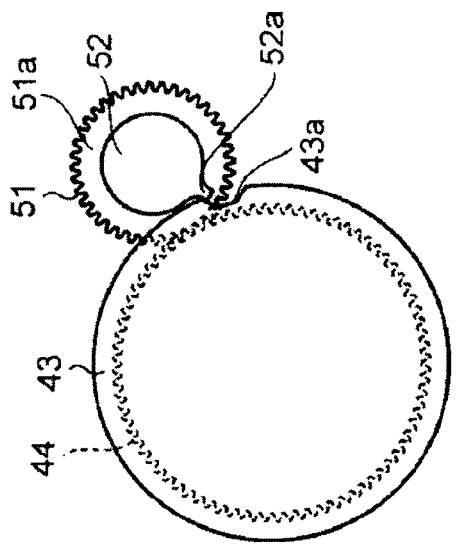
Figure 5:
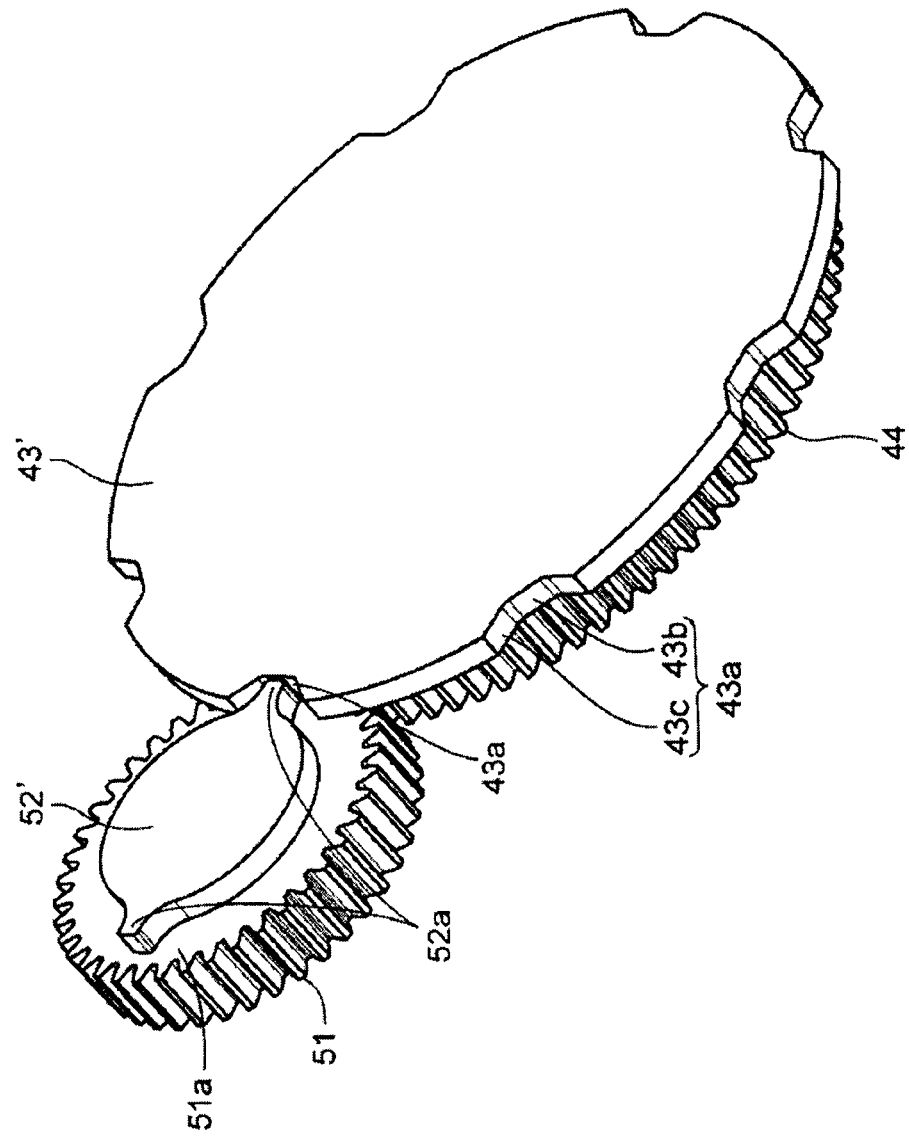
FIG. 5 is a schematic view illustrating a relationship between a projection and a recess of a rotary operation device according to a second embodiment.
Figure 6A:
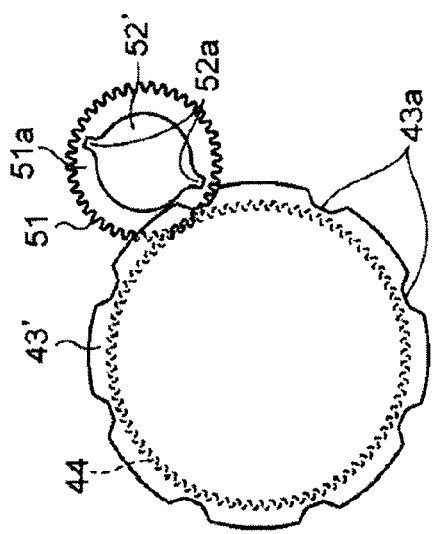
FIGS. 6(a) to 6(d) each illustrate an engagement/disengagement relationship between the projection and the recess of the rotary operation device according to the second embodiment.
Figure 6B:
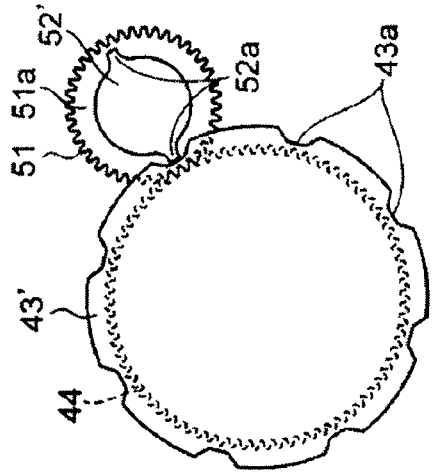
Figure 6C:
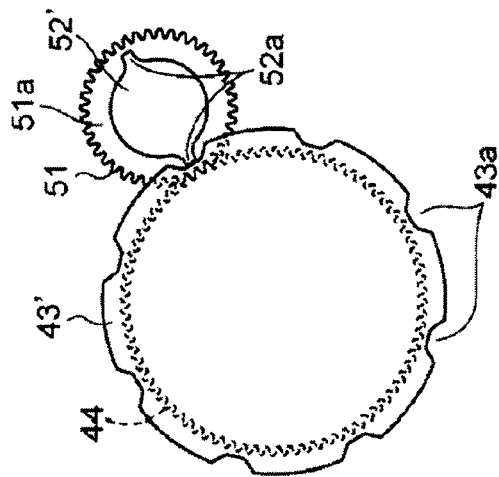
Figure 6D:
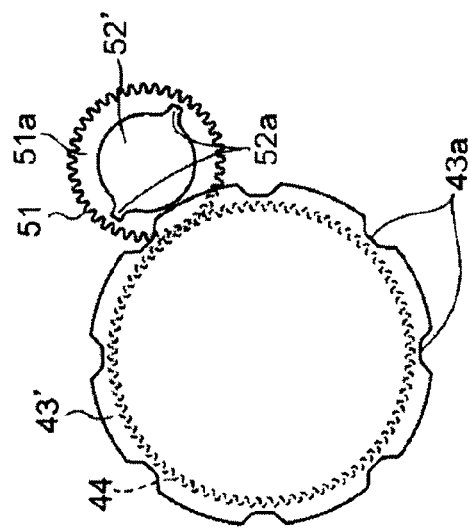

Preferred embodiments of the present invention are described with reference to the drawings. FIGS. 3 and 4(a) to 4(d) show only a second interference portion 43, a recess 43a, a first gear 44, a disk 52, and a second gear 51, which are described later, and exclude other components. FIGS. 5 and 6 show only a second interference portion 43', the recess 43a, the first gear 44, a disk 52', and the second gear 51, which are described later, and exclude other components. In FIGS. 3 to 6(a) to 6(d), a central opening of an inner 40 described later is excluded.

First Embodiment

A rotary operation device according to a first embodiment of the present invention is described with reference to FIGS. 1 to 4(d).

Figure 1:
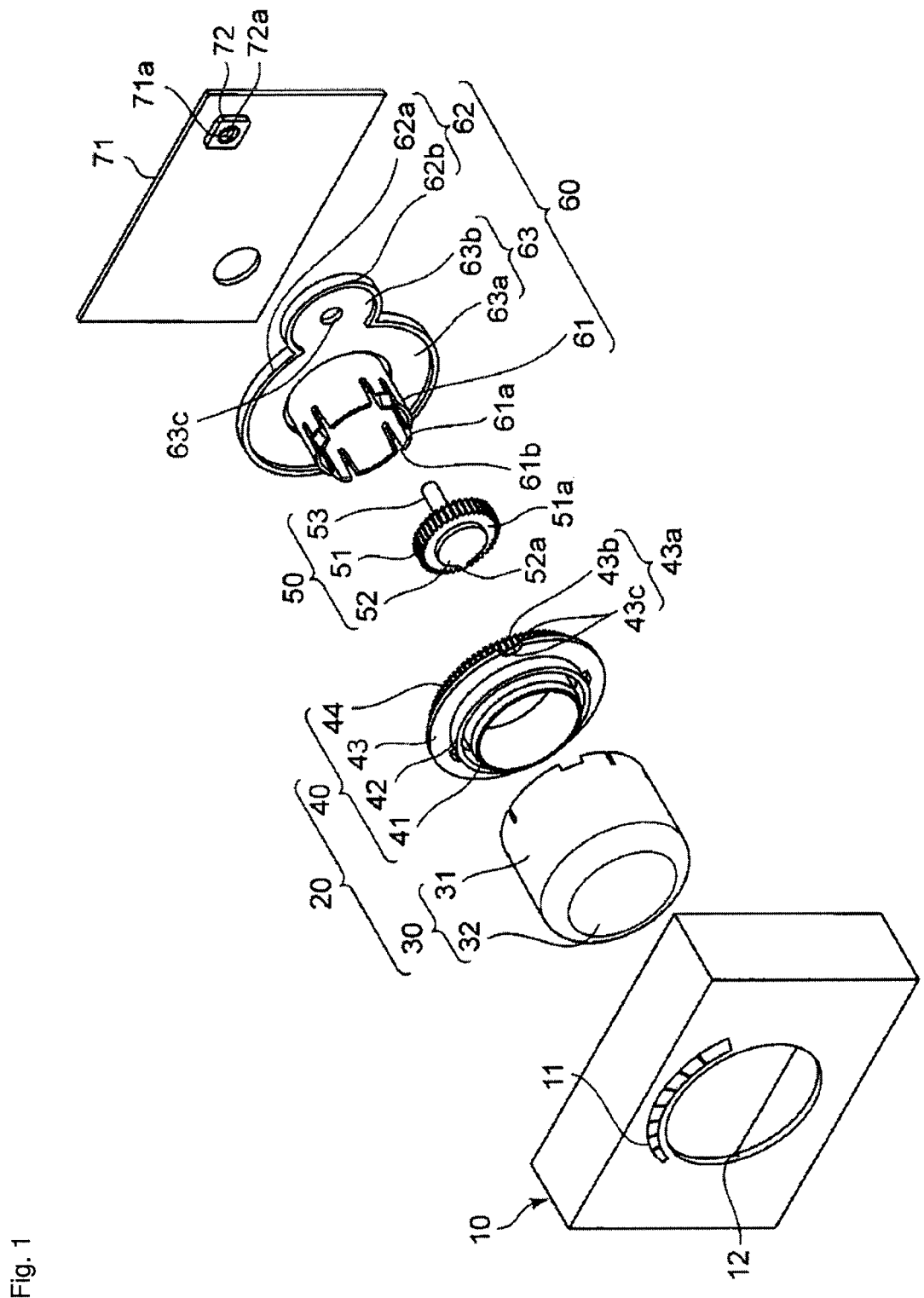
FIG. 1 is an exploded perspective view of a rotary operation device according to a first embedment of the present invention.
Figure 2:
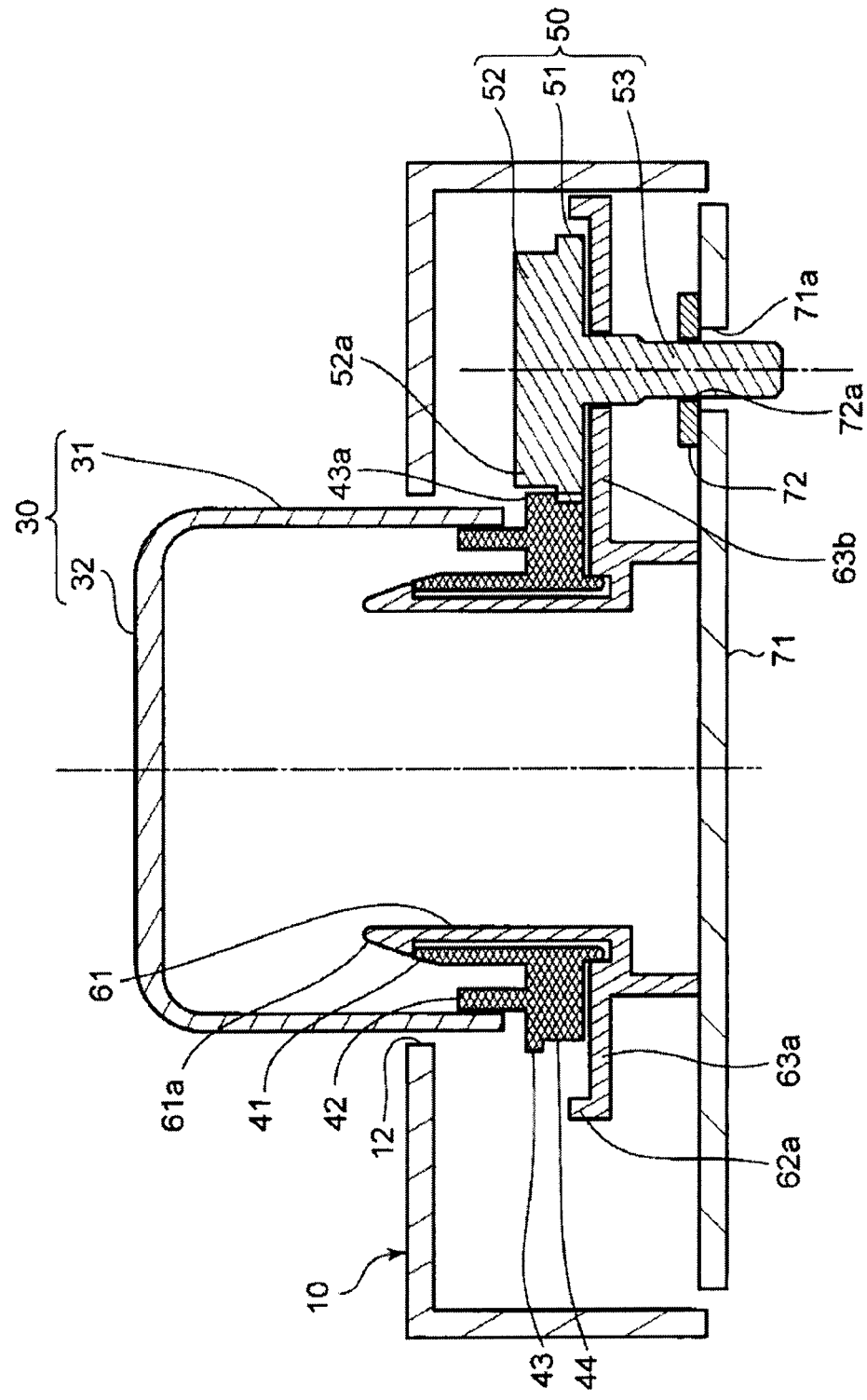
FIG. 2 is a cross-sectional view of the rotary operation device shown in FIG. 1.
Figure 3:
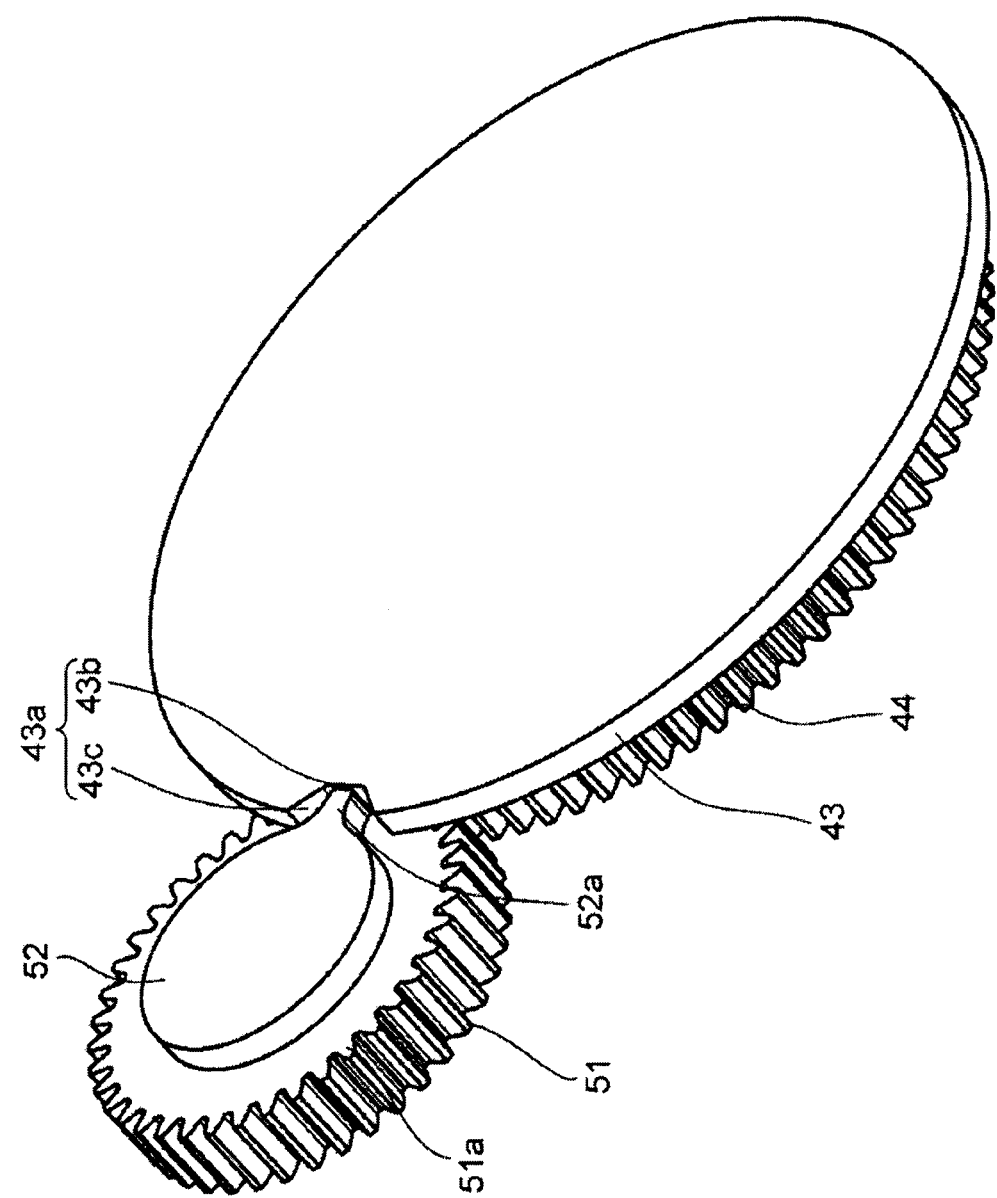
FIG. 3 is a schematic view illustrating a relationship between a projection and a recess of the rotary operation device according to the first embodiment.

With reference to FIGS. 1 and 2, the rotary operation device according to the present embodiment includes a rotary operation member 20, a rotation detector 72, a rotational force transmission member 50, and a holder 60. The rotary operation member 20 is rotated around a specific rotation axis. The rotation detector 72 detects rotary operation of the rotary operation member 20. The rotational force transmission member 50 transmits a rotational force of the rotary operation member 20 to the rotation detector 72. The holder 60 holds the rotary operation member 20 and the rotational force transmission member 50. In the description below, a side on which an operator operates in a rotation axis direction, specifically, an end wall 32 side of a dial 30 described later is referred to as a front surface side or a front end side; and a side opposite thereto is referred to as a rear surface side or a rear end side. The rotary operation device is accommodated in a casing 10 in a state where the dial 30 is exposed to the front surface side.

The casing 10 has a circular opening 11 and a display 12, the opening 11 exposing the dial 30 to the front surface side, the display 12 indicating an operation position of the dial 30. With reference to FIG. 2, the casing 10 accommodates components other than the dial 30 of the rotary operation device.

The rotary operation member 20 has the dial 30 and the inner 40, the dial 30 being rotated by an operator, the inner 40 being connected to the dial 30 so as to be rotated along with the dial 30. The dial 30 and the inner 40 are provided as separate members in the present embodiment, but may be provided integrally.

The dial 30 has a tubular holding portion 31 and an end wall 32, the holding portion 31 being held for rotary operation, the end wall 32 being provided on the front end side of the holding portion 31. A rear end portion of the holding portion 31 has an engaged portion for connection with the inner 40. The engaged portion is connected to the inner 40, thus preventing relative rotation of the dial 30 and the inner 40. The end wall 32 closes the front end side of the holding portion 31 and is connected to the front end of the holding portion 31.

The inner 40 has an inner tubular portion 41, a dial connector 42, the second interference portion 43, the recess 43a, and the first gear 44. The inner tubular portion 41 can be engaged with a hook 61a described later. The dial connector 42 is connected to the dial 30. The second interference portion 43 is provided on an outer peripheral surface of the dial connector 42. The recess 43a, which serves as an escape portion, is provided in a position circumferentially adjacent to the second interference portion 43. The first gear 44 transmits a rotational force exerted on the rotary operation member 20 to the rotational force transmission member 50. As shown in FIGS. 1 and 2, the inner 40 has an opening in a central portion thereof through which an inner connector 61 described later can be inserted.

The dial connector 42 has a tubular shape slightly larger than the inner tubular portion 41 and is fitted into the holding portion 31. The dial connector 42 has an engaging portion which is engaged with the engaged portion of the holding portion 31.

The second interference portion 43 projects outward in a radial direction orthogonal to the rotation axis from the outer peripheral surface on the rear end side of the dial connector 42. An outer periphery of the second interference portion 43 has an arcuate shape. The recess 43a is recessed inward of the outer periphery of the second interference portion 43 in the radial direction. Functions of the second interference portion 43 and the recess 43a are described later.

The first gear 44 is provided in a position different from the position where the second interference portion 43 is provided in the rotation axis direction. In the present embodiment, the first gear 44 is positioned closer to the rear surface side than the second interference portion 43. Specifically, the first gear 44 is an external gear having a smaller diameter than that of the second interference portion 43.

The rotational force transmission member 50 is coupled with the rotary operation member 20 and the rotation detector 72 so as to transmit the rotational force of the rotary operation member 20 to the rotation detector 72. Specifically, the rotational force transmission member 50 has the second gear 51, a disk 52, and a transmission axis 53. The second gear 51 is engaged with the first gear 44. The disk 52 is provided on the front surface side of the second gear 51. The transmission axis 53 is rotated integrally with the second gear 51 and is coupled with the rotation detector 72.

The second gear 51 is engaged with the first gear 44 and is thus rotated in association with rotation of the rotary operation member 20. In the present embodiment, the second gear 51 is an external gear having a fewer number of teeth than the first gear 44. Specifically, the number of teeth is a quarter of that of the first gear 44. Furthermore, the second gear 51 has a rotation surface 51a rotated in association with rotation of the second gear 51 in a rotation direction thereof. The rotation surface 51a is provided on the front surface side of the second gear 51 and intersects the rotation axis direction of the second gear 51. In the present embodiment, the rotation surface 51a is a plane orthogonal to the axis direction of the transmission axis 53.

The disk 52 is connected to the front surface side of the rotation surface 51a and projects from the rotation surface 51a toward the front surface side. The disk 52 is accommodated inside an outer periphery of the rotation surface 51a. The disk 52 has a circular main body and a projection 52a projecting outward from an outer periphery of the main body in a radial direction thereof to serve as a first interference portion. The main body has a radius so as to be in contact with or substantially proximate to the outer periphery of the second interference portion 43, as shown in FIGS. 4(c) and 4(d). A function of the projection 52a is described later along with the second interference portion 43 and the recess 43a. An example is illustrated in the present embodiment in which the disk 52 has a circular main boy. The main body may be eliminated.

The transmission axis 53 is rotated in association with the rotation of the second gear 51 in the rotation direction thereof. The transmission axis 53 has a long shape in a direction parallel to the rotation axis of the rotary operation member 20. The transmission axis 53 is fitted with the rotation detector 72 such that the rotation of the transmission axis 53 is transmitted to the rotation detector 72.

The holder 60 holds the rotary operation member 20 and the rotational force transmission member 50. The holder 60 holds the rotary operation member 20 so as to allow the rotary operation member 20 to rotate relative to the holder 60. The holder 60 holds the rotational force transmission member 50 so as to allow the rotational force transmission member 50 to rotate relative to the holder 60. The holder 60 has an inner connector 61, a peripheral wall 62, and a bottom wall 63. The inner connector 61 can be engaged with the inner tubular portion 41 of the inner 40. The peripheral wall 62 is provided outward of the inner connector 61 relative to the rotation axis of the rotary operation member 20. The bottom wall 63 connects a rear end portion of the inner connector 61 and a rear end portion of the peripheral wall 62.

The inner connector 61 has a hook 61a on the front end side and slits 61b provided on both sides of the hook 61a in the circumferential direction. The inner connector 61 has a diameter so as to be fitted in the inner tubular portion 41 of the inner 40. The hook 61a is engaged with the front end of the inner tubular portion 41 when the inner connector 61 is fitted into the inner tubular portion 41 from the rear surface side of the inner tubular portion 41. In the present embodiment, the inner connector 61 has a tubular shape and four hooks 61a are provided at 90° intervals in the circumferential direction of the inner connector 61. The slits 61b allow the hook 61a to bend in the radial direction.

The peripheral wall 62 has a rotary operation member enclosure 62a that surrounds the rotary operation member 20 and a rotational force transmission member enclosure 62b that surrounds the rotational force transmission member 50. The rotary operation member enclosure 62a is provided concentrically to the inner connector 61. The rotational force transmission member enclosure 62b is connected to the rotary operation member enclosure 62a and projects outward in the radial direction orthogonal to the axis direction of the rotary operation member 20 from the rotary operation member enclosure 62a.

The bottom wall 63 has a plane orthogonal to the rotation axis of the rotary operation member 20. The bottom wall 63 has a rotary operation member mount 63a on which the rotary operation member 20 is mounted and a rotational force transmission member mount 63b on which the rotational force transmission member 50 is mounted. The rotary operation member 20 is mounted on the rotary operation member mount 63a such that the front surface thereof and the rear surface of the first gear 44 are opposite to each other. The rotational force transmission member 50 is mounted on the rotational force transmission member mount 63b such that the front surface thereof and the rear surface of the second gear 51 are opposite to each other. With reference to FIG. 2, the rear end portion of the inner 40 is engaged with a groove in an inner end of the rotary operation member mount 63a. Then, the inner 40 is rotated relative to the holder 60 while an outer peripheral surface of the rear end portion is slid in contact with an inner peripheral surface of the groove. The rotational force transmission mount 63b includes a transmission axis though-hole 63c through which the transmission axis 53 of the rotational force transmission member 50 can be inserted.

The rotation detector 72 is mounted on a circuit board 71 having a predetermined wiring pattern. The circuit board 71 has a transmission axis through hole 71a through which the transmission axis 53 of the rotational force transmission member 50 can be inserted to the rear surface side.

The rotation detector 72 has a rotation member capable of rotating relative to the circuit board 71. The rotation of the rotation member switches contact points included in the rotation detector 72. The rotation detector 72 can be of a variable resistance type or a rotary encoder that outputs pulses. The rotation member has a transmission axis fitting hole 72a in which the transmission axis 53 can be fitted. The rotation member is rotated by the rotation of the transmission axis 53 inserted through the transmission axis fitting hole 72a. In other words, the transmission axis fitting hole 72a can transmit the rotation of the transmission axis 53 to the rotation member. Specifically, the transmission axis fitting hole 72a has a shape that matches a cross-sectional shape of the transmission axis 53 in a direction orthogonal to the rotation axis in the transmission axis 53. In the present embodiment, the cross-sectional shape of the transmission axis 53 and the shape of the transmission axis fitting hole 72a are each substantially a D shape. The transmission axis fitting hole 72a and the transmission axis through hole 71a are aligned in the rotation axis direction of the transmission axis 53. The transmission axis 53, which is inserted through the transmission axis through hole 63c, is inserted through the transmission axis fitting hole 72a and the transmission axis through hole 71a.

The functions of the second interference portion 43, the recess 43a, and the projection 52a as the first interference portion are described below.

The second interference portion 43, the recess 43a, and the projection 52a allow assembly of the rotary operation member 20 and the rotational force transmission member 50 only when the first gear 44 and the second gear 51 are provided in a proper engagement position (position shown in FIG. 3) where the gears are engaged in a proper phase relationship, and prevent assembly of the members in a position other than the proper engagement position. Specifically, the projection 52a projects in a direction connecting central axes of the first gear 44 and the second gear 51 in the proper engagement position; the recess 43a is capable of receiving the projection 52a without interfering with the projection 52a in the proper engagement position; the second interference portion 43 interferes with the projection 52a when the members are attempted to be assembled in a position other than the proper engagement position. Accordingly, with the first gear 44 and the second gear 51 in the proper engagement position, the projection 52a is received in the recess 43a and does not interfere with the second interference portion 43, thus allowing assembly of the members at this position, while with the first gear 44 and the second gear 51 in a position other than the proper engagement position, the projection 52a interferes with the second interference portion 43, thus preventing assembly of the members at this position.

In the present embodiment, the recess 43a has an opposing portion 43b and a pair of widening portions 43c. The opposing portion 43b is a plane that faces an outer (right in FIG. 3) portion of the projection 52a orthogonal to a rotation axis direction in the projection 52a when the first gear 44 and the second gear 51 are provided in the proper engagement position. The widening portions 43c, which extend from the opposing portion 43b, are widening planes that are further apart from each other toward the projection 52a from two ends of the second interference portion 43 in the rotation direction in the opposing portion 43b. The recess 43a does not have to include the opposing portion 43b and the pair of widening portions 43c. The recess 43a may have a shape in which the pair of widening portions 43c is directly adjacent to each other without the opposing portion 43b, specifically, substantially a V shape from a plan view; or a shape that includes a curved surface shaped into a recess inward in the radial direction from the outer periphery of the second interference portion 43.

An assembly process of the rotary operation device is described below. The rotary operation device according to the present embodiment can be assembled from one direction, as described below.

First, the circuit board 71 is prepared on which the rotation detector 72 is mounted. Then, the rear end portion of the holder 60 is brought into contact with the front surface side of the circuit board 71. The holder 60 is fixed to the circuit board 71 by a fixer (not shown in the drawing) so as not to rotate relative to the circuit board 71. At this time, the holder 60 is fixed to the circuit board 71 such that the position of the transmission axis through hole 63c of the holder 60 and the positions of the transmission axis fitting hole 72a and the transmission axis through hole 71a are aligned in a direction parallel to the rotation axis of the transmission axis 53.

The rotational force transmission member 50 is mounted on the rotational force transmission member mount 63b such that the transmission axis 53 is inserted through the transmission axis through hole 63c, the transmission axis fitting hole 72a, and the transmission axis through hole 71a. At this time, the transmission axis 53 is coupled with the rotation detector 72 while it is reliably positioned to the transmission axis fitting hole 72a.

Subsequently, the inner tubular portion 41 of the inner 40 is externally fitted to the inner connector 61 such that the first gear 44 and the second gear 51 are provided in the proper engagement position. At this time, when the first gear 44 and the second gear 51 are not provided in the proper engagement position, specifically, when the projection 52a of the rotational force transmission member 50 and the recess 43a of the inner 40 are not in a positional relationship aligned in the rotation axis direction, the inner 40 and the rotational force transmission member 50 are not allowed to be assembled. When the projection 52a and the recess 43a are positioned in alignment with the rotation axis direction, specifically, only when a phase relationship is achieved in which the both gears are provided in the proper engagement position, the inner 40 is allowed to be inserted to the holder 60. Once the projection 52a is received in the recess 43a, the hook 61a is engaged with the front end of the inner tubular portion 41. The hook 61a is pressed to the inner peripheral surface of the inner tubular portion 41 at the time of insertion and is thus bent inward and displaced. Upon completion of the insertion, the hook 61 a restores to a neutral position due to its resilience and engages with the front end of the inner tubular portion 41. The projection 52a as the first interference portion is connected to the rotation surface 51a in a position inward of the outer periphery of the rotation surface 51 a of the second gear 51. Different from a case where the projection 52a projects outward of the outer periphery of the rotation surface 51a, the projection 52a is thus effectively prevented from being damaged even when an external force is exerted on the projection 52a in the rotation axis direction due to a contact of the second interference portion 43 with the projection 52a during assembly of the inner 40 and the rotational force transmission member 50. The inner 40 may be assembled to the holder 60 in a state of being assembled with the rotational force transmission member 50.

Lastly, the dial 30 is externally fitted to the inner 40 to integrate the both components.

Operations of the rotary operation device according to the present embodiment is described below.

Rotating the dial 30 by holding the holding portion 31 of the dial 30 rotates the inner 40 concurrently with the dial 30. Thus, rotating the dial 30 rotates the rotational force transmission member 50, which has the second gear 51 engaged with the first gear 44 of the inner 40. Then, the rotation of the rotational force transmission member 50 is transmitted through the transmission axis 53 to the rotation detector 72, from which a predetermined signal is output.

Behaviors of the rotary operation member 20 and the rotational force transmission member 50 are described with reference to FIGS. 4(a) to 4(c). FIGS. 4(a) to 4(c) each illustrate a state where the rotary operation member 20 is gradually rotated from a state where the rotary operation member 20 and the rotational force transmission member 50 are provided in the proper engagement position. Specifically, FIG. 4(a) illustrates a state where the both members are in the proper engagement position; FIG. 4(b) illustrates a state where the rotary operation member 20 is rotated by 6° from the state of FIG. 4(a); FIG. 4(c) illustrates a state where the rotary operation member 20 is rotated by 15° from the state of FIG. 4(a); FIG. 4(d) illustrates a state where the rotary operation member 20 is rotated by 21° from the state of FIG. 4(a). As illustrated, the both members do not interfere with each other in the proper engagement position or during relative rotation.

In the present embodiment, whether the rotary operation member 20 is rotated in a forward or reverse direction from the state of FIG. 4(a), the projection 52a interferes with the second interference portion 43 immediately before the rotation angle reaches 90°. Specifically, the rotary operation member 20 of the present embodiment is designed such that the rotatable angle is less than 180°. In such a configuration in which the rotation angle of the rotary operation member 20 is limited, a variable resistance type is preferred for the rotation detector 72. The rotary operation device is applied to temperature setting of an air conditioner or volume control of a car audio system. Even in such a case, however, a rotary encoder can be used as the rotation detector 72.

As described above, the rotary operation device of the present embodiment can prevent misassembly of the rotary operation member 20 and the rotational force transmission member 50. Specifically, when the first gear 44 and the second gear 51 are provided in the proper engagement position, the projection 52a is received in the recess 43a and thus the projection 52a and the second interference portion 43 do not interfere with each other, allowing assembly of the members at this position. In contrast, when the first gear 44 and the second gear 51 are provided in a position other than the proper engagement position, the projection 52a interferes with the second interference portion 43, thus preventing assembly of the members at this position. This prevents a defective product with misassembled members from being transferred to the next process in a manufacturing process or from going on sale.

Second Embodiment

A rotary operation device according to a second embodiment of the present invention is described below with reference to FIGS. 5 and 6(a) to 6(d). In the second embodiment, descriptions are included only on portions different from the first embodiment; descriptions are omitted for structures, functions, and effects same as those in the first embodiment.

There is a case where the rotary operation device of the present invention is allowed to have a plurality of proper engagement positions depending on an apparatus in which the device is mounted. An example is a case where a rotary encoder that outputs pulses is used as the rotation detector 72 and the rotary operation member 20 is rotatable 360°. In this case, a plurality of recesses 43a associated with pulse intervals are provided to provide a plurality of proper engagement positions. The rotary operation device of the second embodiment is different from the rotary operation device of the first embodiment in that a plurality of second interference portions 43', recesses 43a, and projections 52a is provided, specifically, a plurality of proper engagement positions exist.

The inner 40 according to the present embodiment has a plurality of second interference portions 43' on an outer peripheral surface of a dial connector 42 and a plurality of recesses 43a provided between the second interference portions 43'. Specifically, eight second interference portions 43' and eight recesses 43a are provided at 45° intervals in a circumferential direction of the dial connector 42. A disk 52' has a circular main body and a plurality of projections 52a on an outer periphery of the main body. Specifically, two projections 52a are provided at 180° intervals along the outer peripheral surface of the main body. Thus, the rotary operation device of the present embodiment has a plurality of proper engagement positions, specifically, eight positions for each projection 52a. The number of teeth of the first gear 44 and the number of teeth of the second gear 51 are identical to those in the first embodiment.

An assembly process of the rotary operation device of the present embodiment is described below.

The circuit board 71 is prepared on which the rotation detector 72 is mounted. A process of fixing the holder 60 to the circuit board 71 and a process of coupling the rotational force transmission member 50 with the rotation detector 72 are the same as those in the first embodiment.

Thereafter, the inner 40 is assembled to the holder 60. Unlike the first embodiment, assembly of the components is allowed at this time, provided any of the recesses 43a and any of the projections 52a are in a positional relationship aligned in the rotation axis direction.

Subsequently, behaviors of the rotary operation member 20 and the rotational force transmission member 50 when the rotary operation member 20 of the present embodiment is rotated are described with reference to FIGS. 6(*a*) to 6(*d*). FIGS. 6(*a*) to 6(*d*) each illustrate a state where the rotary operation member 20 is gradually rotated from a state where the rotary operation member 20 and the rotational force transmission member 50 are provided in the proper engagement position. Specifically, FIG. 6(*a*) illustrates a state where the both members are in the proper engagement position; FIG. 6(*b*) illustrates a state where the rotary operation member 20 is rotated by 15° from the state of FIG. 6(*a*); FIG. 6(*c*) illustrates a state where the rotary operation member 20 is rotated by 30° from the state of FIG. 6(*a*); FIG. 6(*d*) illustrates a state where the rotary operation member 20 is rotated by 45° from the state of FIG. 6(*a*). As illustrated, the both members do not interfere with each other in the proper engagement position or during relative rotation. Every time the rotary operation member 20 is rotated by 45°, the projection 52a is received in the recess 43a. In the present embodiment, whether the rotary operation member 20 is rotated in a forward or reverse direction from the state of FIG. 6(*a*), the rotary operation member 20 is rotatable 360°.

In a configuration in which the rotation angle of the rotary operation member 20 is not limited as described above, a rotary encoder that outputs pulses is preferred for the rotation detector 72. The rotary operation device is applied to indication selection of a car navigation system. Even in such a case, however, a variable resistance type can be used as the rotation detector 72.

In use of a rotary encoder for the rotation detector 72, the rotation detector 72 generates pulses in accordance with a rotary operation amount of the rotary operation member 20. The number of teeth of the both gears and the angle between the recesses 43a are defined in accordance with pulse intervals. Thus, even when the members are assembled such that the projection 52a is positioned in any of the plurality of recesses 43a, the rotation detector 72 generates a pulse when the rotary operation member 20 is operated for a predetermined rotary operation amount from the assembled position. In other words, a plurality of proper engagement positions can be provided by defining the both gears and the recesses 43a as described above.

In addition, the rotary operation device preferably has a mechanism (commonly referred to as a click mechanism) to hold an operation position of the rotary operation member 20. With a rotary encoder used for the rotation detector 72, the mechanism holds an operation position of the rotary operation member 20 at a position where a point of pulse generation is surpassed. With a variable resistance type used for the rotation detector 72, a threshold is set such that a predetermined output is provided above a predetermined resistance value and a holding position is defined such that an operation position of the rotary operation member 20 is held at a position where the threshold is surpassed. Thus, every time an operator feels a click by rotating the rotary operation member 20, the output from the rotation detector 72 is switched.

As described above, the rotary operation device of the second embodiment can also prevent misassembly of the rotary operation member 20 and the rotational force transmission member 50. Specifically, when the first gear 44 and the second gear 51 are provided in one of the plurality of proper engagement positions, the projection 52a is received in the recess 43a and thus the projection 52a and the second interference portion 43 do not interfere with each other, allowing assembly of the members at this position. In contrast, when the first gear 44 and the second gear 51 are provided in a position other than any of the proper engagement positions, the projection 52a interferes with the second interference portion 43, thus preventing assembly of the members at this position.

The embodiments disclosed herein are provided for exemplary purposes in all aspects and should not be construed as limitations. The scope of the present invention is recited in the scope of the patent claims, not in the descriptions of the embodiments above. Furthermore, equivalents of the scope of the patent claims and all modifications within the scope are included.

For example, the rotary operation member 20 has the second interference portion 43, 43' and the recess 43a while the rotational force transmission member 50 has the projection 52a as the first interference portion in the present embodiments. However, they may be provided in a reverse manner. Specifically, the rotary operation member 20 may have a projection and the rotational force transmission member 50 may have a second interference portion and a recess. In this case, the projection may have a shape projecting outward of the outer shape of the first gear 44 in the radial direction or a shape positioned inward in the radial direction. The second interference portion and the recess may be positioned inward of the outer shape of the second gear 51 in the radial direction or a shape positioned outward in the radial direction.

In the embodiments above, the second interference portion 43, 43' and the recess 43a are provided on the front surface of the first gear 44 and the projection 52a is provided on the front surface of the second gear 51. However, they may all be provided on the rear surfaces of the gears.

Furthermore, the second gear 51 is in external contact with the first gear 44 in the embodiments above. However, the first gear may be an internal gear instead of an external gear and the second gear 51 may be disposed so as to be in internal contact with the first gear 44.

Furthermore, the rotation surface 51a of the rotational force transmission member 50 is a plane orthogonal to the axis direction of the transmission axis 53 in the embodiments above. The rotation surface 51a may be a curved surface bulging from the outer periphery of the second gear 51 toward the center thereof.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A rotary operation device comprising:
a rotary operation member rotated around a rotation axis;

a rotation detector detecting rotary operation of the rotary operation member; and
a rotational force transmission member transmitting, to the rotation detector, a rotational force generated in association with the rotary operation of the rotary operation member,
the rotary operation member comprising:
  a first gear transmitting the rotational force of the rotary operation member to the rotational force transmission member,
the rotational force transmission member comprising:
  a second gear engaged with the first gear; and
  a transmission axis linked to the second gear, rotatable around a central axis thereof, and coupled with the rotation detector, wherein
one of the rotary operation member and the rotational force transmission member comprises a first interference portion provided in a portion displaced in a rotation direction in accordance with rotation thereof and having a shape that interferes with the other of the rotary operation member and the rotational force transmission member, so as to prevent assembly with the other member in a position misaligned from a proper engagement position where the first gear and the second gear are engaged in a proper phase relationship, and
the other member comprises a second interference member and an escape portion, the second interference member being provided in a portion displaced in a rotation direction in accordance with rotation thereof and having a shape that interferes with the first interference portion so as to prevent assembly with the one member in a position where the first gear and the second gear are misaligned from the proper engagement position, the escape portion having a shape that receives the first interference portion when the first gear and the second gear are provided in the proper engagement position so as to prevent interference with the first interference portion and allow assembly with the one member, and that prevents interference with the first interference portion when the rotary operation member and the rotational force transmission member are rotated relative to each other in a state where the first gear and the second gear are assembled in the proper engagement position,
the first interference portion is a projection projecting radially outwardly from the rotation axis to a position radially inward of an outer periphery of the gear of the one member, and
the second interference portion is a projection projecting radially outwardly from the rotation axis to a position outward of an outer periphery of gear teeth of the gear of the other member.

2. The rotary operation device according to claim 1, wherein
the gear of the one member is rotated in the rotation direction thereof and comprises a rotation surface intersecting a rotation axis direction of the gear, and the first interference portion is linked to the rotation surface at a position inward of an outer periphery of the rotation surface, and
the escape portion is positioned adjacent to the second interference portion along a circumferential direction of the other member.

3. The rotary operation device according to claim 2, wherein
the first interference portion is a projection projecting from the rotation surface in the rotation axis direction of the gear of the one member, and the escape portion is a recess recessed inward of an outer periphery of the second interference portion, and the recess comprises an opposing portion and a pair of widening portions, the opposing portion facing an outer portion of the projection such that the opposing portion is orthogonal to the rotational axis direction of the projection when the first gear and the second gear are provided in the proper engagement position, the pair of widening portions extending from the opposing portion and widening so as to be further apart from each other toward the projection from two ends of the second interference portion in the rotation direction in the opposing portion.

4. A rotary operation device comprising:
a rotary operation member rotated around a rotation axis;
a rotation detector detecting rotary operation of the rotary operation member; and
a rotational force transmission member transmitting, to the rotation detector, a rotational force generated in association with the rotary operation of the rotary operation member,
the rotary operation member comprising:
  a first gear transmitting the rotational force of the rotary operation member to the rotational force transmission member,
the rotational force transmission member comprising:
  a second gear engaged with the first gear; and
  a transmission axis linked to the second gear, rotatable around a central axis thereof, and coupled with the rotation detector, wherein
one of the rotary operation member and the rotational force transmission member comprises a first interference portion provided in a portion displaced in a rotation direction in accordance with rotation thereof and having a shape that interferes with the other of the rotary operation member and the rotational force transmission member, so as to prevent assembly with the other member in a position misaligned from a proper engagement position where the first gear and the second gear are engaged in a proper phase relationship,
the other member comprises a second interference member and an escape portion, the second interference member being provided in a portion displaced in a rotation direction in accordance with rotation thereof and having a shape that interferes with the first interference portion so as to prevent assembly with the one member in a position where the first gear and the second gear are misaligned from the proper engagement position, the escape portion having a shape that receives the first interference portion when the first gear and the second gear are provided in the proper engagement position so as to prevent interference with the first interference portion and allow assembly with the one member, and that prevents interference with the first interference portion when the rotary operation member and the rotational force transmission member are rotated relative to each other in a state where the first gear and the second gear are assembled in the proper engagement position;
the gear of the one member is rotated in the rotation direction thereof and comprises a rotation surface intersecting a rotation axis direction of the gear, and the first interference portion is linked to the rotation surface at a position inward of an outer periphery of the rotation surface, and
the second interference portion has a shape projecting outward of an outer periphery of the gear of the other member in a radial direction of the gear, and the escape portion is positioned adjacent to the second interference portion along a circumferential direction of the other member;

the first interference portion is a projection projecting from the rotation surface in the rotation axis direction of the gear of the one member, and the escape portion is a recess recessed inward of an outer periphery of the second interference portion, and the recess comprises an opposing portion and a pair of widening portions, the opposing portion facing an outer portion of the projection such that the opposing portion is orthogonal to the rotational axis direction of the projection when the first gear and the second gear are provided in the proper engagement position, the pair of widening portions extending from the opposing portion and widening so as to be further apart from each other toward the projection from two ends of the second interference portion in the rotation direction in the opposing portion.

* * * * *